United States Patent
Chizawa (10) Patent No.: US 11,562,862 B2
(45) Date of Patent: *Jan. 24, 2023

(54) NONAQUEOUS ELECTROLYTE ENERGY STORAGE DEVICE

(71) Applicant: GS Yuasa International Ltd., Kyoto (JP)

(72) Inventor: Suguru Chizawa, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 14 days.

This patent is subject to a terminal disclaimer.

(21) Appl. No.: 17/241,551

(22) Filed: Apr. 27, 2021

(65) Prior Publication Data
US 2021/0249198 A1    Aug. 12, 2021

Related U.S. Application Data

(63) Continuation of application No. 16/496,283, filed as application No. PCT/JP2018/011046 on Mar. 20, 2018, now Pat. No. 11,024,470.

(30) Foreign Application Priority Data

Mar. 23, 2017    (JP) .............................. JP2017-057847

(51) Int. Cl.
*H01G 11/42*    (2013.01)
*H01M 4/133*    (2010.01)
(Continued)

(52) U.S. Cl.
CPC ............ *H01G 11/42* (2013.01); *H01M 4/133* (2013.01); *H01M 4/366* (2013.01); *H01M 4/625* (2013.01); *C04B 2235/425* (2013.01)

(58) Field of Classification Search
CPC ............ C04B 2235/425; H01G 11/42; H01M 4/133; H01M 4/366; H01M 4/625
See application file for complete search history.

(56) References Cited

U.S. PATENT DOCUMENTS 9,711,825 B2    7/2017   Azami et al.
11,024,470 B2 *  6/2021   Chizawa ............... H01M 4/133
(Continued)

FOREIGN PATENT DOCUMENTS

CN    102610791 A    7/2012
JP    H10312790 A    11/1998
(Continued)

OTHER PUBLICATIONS

International Search Report dated Jun. 26, 2018 filed in PCT/JP2018/0110466.
(Continued)

*Primary Examiner* — Nathan Milakovich
(74) *Attorney, Agent, or Firm* — Rankin, Hill & Clark LLP (57) ABSTRACT

The nonaqueous electrolyte energy storage device according to an aspect of the present invention includes a negative electrode including graphite and graphitizable carbon, in which a ratio of a mass of the graphitizable carbon to a total mass of the graphite and the graphitizable carbon is less than 26% by mass, and a median diameter of the graphitizable carbon is smaller than a median diameter of the graphite.

16 Claims, 1 Drawing Sheet

(51) Int. Cl.
  *H01M 4/36*   (2006.01)
  *H01M 4/62*   (2006.01)

(56) References Cited

U.S. PATENT DOCUMENTS

| | | |
|---|---|---|
| 2013/0130114 A1 | 5/2013 | Ohno |
| 2013/0323601 A1 | 12/2013 | Nishimura |
| 2016/0181614 A1 | 6/2016 | Suga |
| 2017/0133676 A1 | 5/2017 | Kodato et al. |
| 2018/0145329 A1 | 5/2018 | Endo et al. |

FOREIGN PATENT DOCUMENTS

| | | | | |
|---|---|---|---|---|
| JP | 2006338977 A | | 12/2006 | |
| JP | 2007026724 A | | 2/2007 | |
| JP | 2009070598 A | | 4/2009 | |
| JP | 2009-117240 A | | 5/2009 | |
| JP | 2009117240 A | | 5/2009 | |
| JP | 2009117240 A | * | 5/2009 | ........ H01M 10/0525 |
| JP | 2010218937 A | | 9/2010 | |
| JP | 2011119072 A | | 6/2011 | |
| JP | 2014035793 A | | 2/2014 | |
| JP | 2016119153 A | | 6/2016 | |
| JP | 2017033865 A | | 2/2017 | |
| JP | 2017107808 A | | 6/2017 | |
| KR | 101199915 B1 | | 11/2012 | |
| KR | 2016-0018174 A | | 2/2016 | |
| WO | 2012086618 A1 | | 6/2012 | |
| WO | 2012014259 A1 | | 9/2013 | |
| WO | 2014/0244 73 A1 | | 2/2014 | |
| WO | WO-2014024473 A1 | * | 2/2014 | ........ H01M 10/0525 |
| WO | 2012144618 A1 | | 7/2014 | |
| WO | 2014133070 A1 | | 9/2014 | |
| WO | 2014024473 A1 | | 7/2016 | |
| WO | 2017068985 A1 | | 8/2018 | |

OTHER PUBLICATIONS

Extended European Search Report (EESR) dated May 19, 2020 issued in the corresponding European Patent Application No. 18771671.7.

* cited by examiner

NONAQUEOUS ELECTROLYTE ENERGY STORAGE DEVICE

TECHNICAL FIELD

The present invention relates to a nonaqueous electrolyte energy storage device.

BACKGROUND ART

Nonaqueous electrolyte secondary batteries typified by lithium ion secondary batteries have been widely used in electronic devices such as personal computers and communication terminals, automobiles and the like in terms of high energy density. The nonaqueous electrolyte secondary battery generally has a pair of electrodes electrically isolated by a separator and a nonaqueous electrolyte interposed between the electrodes, and is charged and discharged by transferring ions between both of the electrodes. In addition, capacitors such as lithium ion capacitors and electric double layer capacitors are widely used as nonaqueous electrolyte energy storage devices other than nonaqueous electrolyte secondary batteries.

A positive electrode and a negative electrode of such a nonaqueous electrolyte energy storage device contain an active material that occludes and releases lithium ions and the like. As the negative active material, carbon materials such as graphite are widely used. For example, a lithium secondary battery including the negative electrode in which graphite and amorphous carbon are used in combination with the negative active material has been proposed (refer to Patent Document 1).

PRIOR ART DOCUMENT

Patent Document

Patent Document 1: JP-A-2010-218937

SUMMARY OF THE INVENTION

Problems to be Solved by the Invention

One of the performances required for the nonaqueous electrolyte energy storage device is that a change rate in power resistance accompanying a charge-discharge cycle is small. However, in a case where only graphite which is current mainstream in the negative electrode is used, the charge-discharge cycle characteristics may deteriorate.

The present invention has been made based on the circumstances as described above, and an object thereof is to provide a nonaqueous electrolyte energy storage device in which an increase in power resistance accompanying a charge-discharge cycle under a high temperature is suppressed.

Means for Solving the Problems

According to one aspect of the present invention made in order to solve the above-described problem, there is provided a nonaqueous electrolyte energy storage device including a negative electrode including graphite and graphitizable carbon, in which a ratio of a mass of the graphitizable carbon to a total mass of the graphite and the graphitizable carbon is less than 26% by mass, and a median diameter of the graphitizable carbon is smaller than a median diameter of the graphite.

Advantages of the Invention

According to the present invention, it is possible to provide a nonaqueous electrolyte energy storage device in which an increase in power resistance accompanying a charge-discharge cycle under a high temperature is suppressed.

MODE FOR CARRYING OUT THE INVENTION

A nonaqueous electrolyte energy storage device according to an embodiment of the present invention includes a negative electrode including graphite and graphitizable carbon, in which a ratio of a mass of the graphitizable carbon to a total mass of the graphite and the graphitizable carbon is less than 26% by mass, and a median diameter of the graphitizable carbon is smaller than a median diameter of the graphite.

The nonaqueous electrolyte energy storage device having the above-described configuration can suppress an increase in power resistance accompanying a charge-discharge cycle under a high temperature (hereinafter, sometimes simply referred to as an "increase in power resistance"). The reason for this is not clear, but it is presumed that it is influenced by the fact that by containing a predetermined proportion of graphitizable carbon with a small particle size relative to graphite, the filling rate is increased, and as a result, the occurrence of side reactions at an interface with nonaqueous electrolyte is suppressed, and the conductivity is increased.

Here, the "graphite" refers to a carbon material having an average grid spacing (d002) of less than 0.340 nm for (002) face determined by a wide-angle X-ray diffraction method. The "graphitizable carbon" refers to a carbon material that has d002 of 0.340 nm or more and converts to graphite when heated to 3300 K under normal pressure.

The "median diameter" means a value (D50) at which the volume-based integrated distribution calculated according to JIS-Z-8819-2 (2001) is 50%. Specifically, the median diameter (D50) can be a value measured by the following method. Measurement is performed using a laser diffraction particle size distribution measurement apparatus ("SALD-2200" manufactured by Shimadzu Corporation) as a measurement apparatus, and WingSALD-2200 as measurement control software. A scattering measurement mode is employed, a wet cell in which a dispersion liquid containing particles of a measurement sample dispersed in a dispersion solvent circulates is irradiated with laser light, and a distribution of scattering light is obtained from the measurement sample. Then, the distribution of scattering light is approximated by a lognormal distribution, and the particle diameter at a degree of accumulation of the particles of 50% (D50) is defined as the median diameter. Note that, it has been confirmed that the median diameter based on the above measurement can be substituted with a number average particle diameter obtained by measuring 50 particles extracted while avoiding extremely large particles and extremely small particles from a scanning electron microscope (SEM) image of the negative electrode.

The ratio of the mass of the graphitizable carbon to the total mass of the graphite and the graphitizable carbon is preferably 7% by mass or more and 21% by mass or less. By setting the ratio of the mass of the graphitizable carbon within the above range, an increase in the power resistance can be further suppressed by increasing the filling rate.

The ratio of the median diameter of the graphitizable carbon to the median diameter of the graphite (graphitizable carbon/graphite) is preferably 0.30 or less. By setting the particle size ratio of the graphitizable carbon to the graphite in this way, the increase in the power resistance can be further suppressed by increasing the filling rate.

The graphite preferably includes natural graphite and artificial graphite. The natural graphite has a relatively low power resistance, while the artificial graphite has excellent cycle life characteristics. Therefore, by using the natural graphite and the artificial graphite in combination as the graphite, the initial power resistance is low, and the subsequent increase in the power resistance can be suppressed.

The mass ratio (natural graphite/artificial graphite) of the natural graphite to the artificial graphite is preferably 37.5/62.5 or more and 75/25 or less. By using natural graphite and artificial graphite in such a mass ratio, it is possible to achieve a good balance that the power resistance is sufficiently suppressed and the durability is sufficiently exhibited, and further suppress the increase in the power resistance accompanying the charge-discharge cycle under a high temperature.

The ratio (major axis/minor axis) of the major axis to the minor axis in the graphitizable carbon is preferably 2 or less. In this way, by using the graphitizable carbon that is nearly spherical, expansion and contraction isotropically occurs during the charge-discharge, so that a decrease in current collection is suppressed, and the increase in the power resistance can be further suppressed The major axis and minor axis are the average values of the major axis and minor axis of any 100 particles observed by SEM. Moreover, the minor axis means the length of the diameter orthogonal to the major axis.

Hereinafter, a nonaqueous electrolyte energy storage device (hereinafter, also simply referred to as "energy storage device") according to an embodiment of the present invention will be described in detail.

<Nonaqueous Electrolyte Energy Storage Device>

The energy storage device according to an embodiment of the present invention has a positive electrode, a negative electrode, and a nonaqueous electrolyte. Hereinafter, a nonaqueous electrolyte secondary battery will be described as an example of the energy storage device. The positive electrode and the negative electrode are usually layered or wound with a separator interposed therebetween to form electrode assemblies alternately superimposed on each other. The electrode assembly is housed in a battery case, and the battery case is filled with the nonaqueous electrolyte. The nonaqueous electrolyte is interposed between the positive electrode and the negative electrode. Moreover, as the battery case, a well-known metal battery case, a resin battery case, and the like which are generally used as the battery case of the nonaqueous electrolyte secondary battery can be used.

(Positive Electrode)

The positive electrode has a positive electrode substrate and a positive electrode mixture layer disposed on the positive electrode substrate directly or via an intermediate layer.

The positive electrode substrate has conductivity. As the material of the substrate, metals such as aluminum, titanium, tantalum, stainless steel, or alloys thereof are used. Among these, aluminum and aluminum alloys are preferable in view of the balance of potential resistance, high conductivity, and cost. Moreover, foil, a vapor deposition film, and the like are exemplified as a formation form of the positive electrode substrate, and the foil is preferable in terms of the cost. That is, an aluminum foil is preferable as the positive electrode substrate. Examples of aluminum or aluminum alloy includes A1085P and A3003P defined in JIS-H-4000 (2014).

The intermediate layer is a coating layer of the surface of the positive electrode substrate, and reduces the contact resistance of the positive electrode substrate and the positive electrode mixture layer by including a conductive particle such as a carbon particle. The structure of the intermediate layer is not particularly limited, and for example, it can include the composition containing a resin binder and a conductive particle. In addition, the "conductive" means that the volume resistivity measured according to JIS-H-0505 (1975) is $10^7$ Ω·cm or less, and the "non-conductive" means that the volume resistivity is more than $10^7$ Ω·cm.

The positive electrode mixture layer is formed of a so-called positive electrode mixture containing a positive active material. In addition, the positive electrode mixture forming the positive electrode mixture layer includes optional components such as a conductive agent, a binder (binding agent), a thickener, and a filler as necessary.

Examples of the positive active material include a composite oxide ($Li_xCoO_2$, $Li_xNiO_2$, $Li_xMnO_3$, $Li_xNi_\alpha Co_{(1-\alpha)}O_2$, and $Li_xNi_\alpha Mn_\beta Co_{(1-\alpha-\beta)}O_2$ which have a layered $\alpha$-NaFeO$_2$ crystal structure, $Li_xMn_2O_4$, $Li_xNi_\alpha Mn_{(2-\alpha)}O_4$ which have a spinel crystal structure, and the like) represented by $Li_xMO_y$ (M represents at least one transition metal) and a polyanion compound ($LiFePO_4$, $LiMnPO_4$, $LiNiPO_4$, $LiCoPO_4$, $Li_3V_2(PO_4)_3$, $Li_2MnSiO_4$, and $Li_2CoPO_4F$) represented by $Li_wMe_x(XO_y)_z$ (Me represents at least one transition metal, and X is for example P, Si, B, and V). The elements or polyanions in these compounds may be partially substituted with other elements or anions. In the positive electrode mixture layer, one kind of these compounds may be used alone, or two or more kinds thereof may be used in combination.

The conductive agent is not particularly limited as long as it is a conductive material that does not adversely affect the performance of the energy storage device. Examples of such a conductive agent include natural or artificial graphite; carbon black such as furnace black, acetylene black, and ketjen black; metal; and conductive ceramics. Examples of the shape of the conductive agent include powder and fiber.

Examples of the binder (binding agent) include a fluororesin (polytetrafluoroethylene (PTFE), polyvinylidene fluoride (PVDF), or the like), a thermoplastic resin such as polyethylene, polypropylene, or polyimide; elastomers such as ethylene-propylene-diene rubber (EPDM), sulfonated EPDM, styrene butadiene rubber (SBR), and fluoro rubber; and a polysaccharide polymer.

Examples of the thickener include a polysaccharide polymer such as carboxymethyl cellulose (CMC) and methyl cellulose. In addition, in a case where the thickener has a functional group that reacts with lithium, it is preferable to deactivate this functional group in advance by methylation or the like.

The filler is not particularly limited as long as it does not adversely affect battery performance. Examples of the main component of the filler include polyolefins such as polypropylene and polyethylene, silica, alumina, zeolite, and glass.

(Negative Electrode)

The negative electrode has a negative electrode substrate and a negative electrode mixture layer disposed on the negative electrode substrate directly or via an intermediate layer. The intermediate layer can have the same configuration as the intermediate layer of the positive electrode.

The negative electrode substrate can have the same configuration as the positive electrode substrate, but as a material, a metal such as copper, nickel, stainless steel, nickel-plated steel or alloys thereof are used, and a copper or copper alloy is preferably used. That is, a copper foil is preferable as the negative electrode substrate. Examples of the copper foil include a rolled copper foil and an electrolytic copper foil.

The negative electrode mixture layer is formed of a so-called negative electrode mixture containing a negative active material. That is, the negative electrode mixture layer is a negative electrode mixture formed in a layer shape. The negative electrode mixture forming the negative electrode mixture layer includes optional components such as a conductive agent, a binder (binding agent), a thickener, and a filler as necessary. As the optional components such as a conductive agent, a binder (binding agent), a thickener, and a filler, the same materials as those for the positive electrode mixture layer can be used.

The negative electrode mixture layer includes graphite and graphitizable carbon. These generally function as a negative active material. The graphite and the graphitizable carbon are each in a particle form.

The graphite may be any of spherical graphite, massive graphite, flake graphite, and the like, and any of natural graphite and artificial graphite. The natural graphite includes those in which a surface of the natural graphite particle is coated with other carbon materials.

The graphite preferably includes natural graphite and artificial graphite. The lower limit of the mass ratio (natural graphite/artificial graphite) of the natural graphite to the artificial graphite may be, for example, 20/80, or 30/70, but is preferably 37.5/62.5, more preferably 40/60, and even more preferably 45/55. On the other hand, the upper limit of the mass ratio may be 90/10, for example, but is preferably 75/25, more preferably 65/35, and even more preferably 55/45. The increase in the power resistance can be further suppressed by setting the mass ratio of the natural graphite to the artificial graphite to be the lower limit or more or the upper limit or less.

The lower limit of the median diameter of the graphite is preferably 7 µm, more preferably 10 µm, even more preferably 13 µm, and particularly preferably 15 µm. On the other hand, the upper limit of the median diameter is preferably 30 µm, more preferably 20 µm, even more preferably 18 µm, and particularly preferably 17 µm. When the median diameter of the graphite is within the above range, the increase in the power resistance can be further suppressed, for example, by further improving a filling density.

Examples of the graphitizable carbon include carbon not having a three-dimensional rule, so-called non-graphitic carbon, obtained by firing a polymer (for example, a thermoplastic resin, petroleum-based or coal-based tar or pitch) whose graphite crystal structure is easily developed by a high-temperature treatment. The graphitizable carbon includes what is called soft carbon.

The median diameter of the graphitizable carbon is not particularly limited as long as it is smaller than the median diameter of the graphite. The lower limit of the median diameter of the graphitizable carbon is preferably 1 µm, more preferably 2 µm, and even more preferably 3 µm. On the other hand, the upper limit of the median diameter is preferably 10 µm, more preferably 8 µm, even more preferably 7 µm, and particularly preferably 6 µm. When the median diameter of the graphitizable carbon is within the above range, the increase in the power resistance can be further suppressed, for example, by further improving a filling density.

The shape of the graphitizable carbon is not particularly limited, but is preferably particulate. The upper limit of the ratio (major axis/minor axis) of the major axis to the minor axis in the graphitizable carbon is preferably 2, and more preferably 1.5. On the other hand, this lower limit may be 1. Thus, the increase in the power resistance can be further suppressed by using the graphitizable carbon that is nearly spherical.

The lower limit of the ratio (graphitizable carbon/graphite) of the median diameter of the graphitizable carbon to the median diameter of the graphite may be, for example, 0.1, but is preferably 0.2, more preferably 0.22, and even more preferable 0.24. On the other hand, the upper limit of the ratio of the median diameter may be 0.5 or 0.4, for example, but is preferably 0.30, more preferably 0.28, and even more preferably 0.26. By setting the particle size ratio of the graphitizable carbon to the graphite in this way, the increase in the power resistance can be further suppressed by increasing the filling rate.

The ratio (graphitizable carbon/(graphite+graphitizable carbon)) of the mass of the graphitizable carbon to the total mass of the graphite and the graphitizable carbon is less than 26% by mass. The upper limit of the ratio of the mass of the graphitizable carbon to the total mass of the graphite and the graphitizable carbon is preferably 21% by mass, and more preferably 14% by mass. By setting the ratio of the mass of the graphitizable carbon the upper limit or less, it is possible to further suppress an increase in the power resistance, particularly an increase in the power resistance after a long-term charge-discharge cycle (for example, 700 cycles).

On the other hand, the ratio of the mass of the graphitizable carbon in the total mass of the graphite and the graphitizable carbon may be more than 0% by mass, and as this lower limit, is preferably 3% by mass, more preferably 5% by mass, even more preferably 6% by mass, particularly preferably 10% by mass, and may be 16% by mass. By setting the ratio of the mass of the graphitizable carbon to the above lower limit or more and the upper limit or less, the initial power resistance can be lowered. Further, it is possible to suppress the increase in the power resistance after the charge-discharge cycle such as a case of a relatively short period (for example, 25 cycles or 50 cycles), or a case where the natural graphite and the artificial graphite are used in combination as graphite.

The negative electrode mixture layer may further contain the negative active material other than the graphite and the graphitizable carbon. Examples of such other negative active materials include metals and semimetals such as Si and Sn; a metal oxide and a semimetal oxide such as Si oxide and Sn oxide; a polyphosphate compound; and carbon materials other than graphite and graphitizable carbon (non-graphitizable carbon and the like). Note that, the lower limit of the total content of the graphite and the graphitizable carbon with respect to the total negative active material is preferably 90% by mass, more preferably 95% by mass, and even more preferably 99% by mass. In this way, by increasing the total content of the graphite and the graphitizable carbon as a negative active material, the effect of the energy storage device, which is to suppress the increase in the power resistance accompanying the charge-discharge cycle at a high temperature, can be more effectively exhibited. The upper limit of the total content may be 100% by mass.

The lower limit of the total content of the graphite and the graphitizable carbon in the negative electrode mixture layer is preferably 80% by mass, more preferably 90% by mass, and even more preferably 95% by mass. On the other hand, the upper limit of the content is, for example, 99% by mass, preferably 98% by mass, and more preferably 97% by mass. By setting the total content of the graphite and the graphitizable carbon in the negative electrode mixture layer within the above range, the increase in the power resistance can be further suppressed while ensuring the excellent adhesion and applicability.

The upper limit of the porosity of the negative electrode mixture layer is preferably 40%, and more preferably 35%. On the other hand, the lower limit of the porosity is, for example, 25%, preferably 30%, and more preferably 32%. By setting the porosity of the negative electrode mixture layer within the above range, the excellent high filling state and ion diffusivity can be exhibited in a balanced manner, and the increase in the power resistance accompanying the charge-discharge cycle can be further suppressed.

Note that, the "porosity" of the negative electrode mixture layer is a value obtained from the following expression from the true density and filling density of the negative electrode mixture layer calculated from the true density of each component constituting the negative electrode mixture layer. The filling density means a value obtained by dividing the mass of the negative electrode mixture layer by the apparent volume of the negative electrode mixture layer. The apparent volume means a volume including a void portion, and can be obtained as a product of a thickness and an area in the negative electrode mixture layer.

$$Porosity(\%)=100-(filling\ density/true\ density)\times 100$$

(Separator)

As the material of the separator, for example, a woven fabric, a nonwoven fabric, a porous resin film, or the like is used. Among these, a porous resin film is preferable from the viewpoint of strength, and a nonwoven fabric is preferable from the viewpoint of liquid retention of the nonaqueous electrolyte. The main component of the separator is preferably polyolefin such as polyethylene or polypropylene from the viewpoint of strength, and is preferably polyimide or aramid from the viewpoint of resistance to oxidative degradation. These resins may be combined. In addition, a composite separator having a porous resin film and an inorganic porous layer may be used.

(Nonaqueous Electrolyte)

As the nonaqueous electrolyte, a known nonaqueous electrolyte that is generally used for a general nonaqueous electrolyte secondary battery (energy storage device) can be used. The nonaqueous electrolyte includes a nonaqueous solvent and an electrolyte salt dissolved in the nonaqueous solvent. Note that, the nonaqueous electrolyte may be a solid electrolyte or the like.

As the nonaqueous solvent, a well-known nonaqueous solvent generally used as a nonaqueous solvent of the general nonaqueous electrolyte for energy storage device can be used. Examples of the nonaqueous solvent include cyclic carbonate, chain carbonate, ester, ether, amide, sulfone, lactone, and nitrile. Among these, it is preferable to use at least cyclic carbonate or chain carbonate, and it is more preferable to use cyclic carbonate and chain carbonate in combination. In a case where the cyclic carbonate and the chain carbonate are used in combination, the volume ratio (cyclic carbonate:chain carbonate) between the cyclic carbonate and the chain carbonate is not particularly limited, but for example, is preferably 5:95 or more and 50:50 or less.

Examples of the cyclic carbonate include ethylene carbonate (EC), propylene carbonate (PC), butylene carbonate (BC), vinylene carbonate (VC), vinyl ethylene carbonate (VEC), chloroethylene carbonate, fluoroethylene carbonate (FEC), difluoroethylene carbonate (DFEC), styrene carbonate, catechol carbonate, 1-phenyl vinylene carbonate, 1,2-diphenyl vinylene carbonate, and among these, EC is preferable.

Examples of the chain carbonate include diethyl carbonate (DEC), dimethyl carbonate (DMC), ethyl methyl carbonate (EMC), and diphenyl carbonate. Among these, EMC is preferable.

As the electrolyte salt, a well-known electrolyte salt generally used as an electrolyte salt of the general nonaqueous electrolyte for energy storage device can be used. Examples of the electrolyte salt include lithium salt, sodium salt, potassium salt, magnesium salt, and onium salt, and the lithium salt is preferable.

Examples of the lithium salt include inorganic lithium salt such as $LiPF_6$, $LiPO_2F_2$, $LiBF_4$, $LiClO_4$, and $LiN(SO_2F)_2$, and the lithium salt having a fluorinated hydrocarbon group such as $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$, and $LiC(SO_2C_2F_5)_3$. Among these, the inorganic lithium salt is preferable, and $LiPF_6$ is more preferable.

The lower limit of the content of the electrolyte salt in the nonaqueous electrolyte is preferably 0.1 M, more preferably 0.3 M, even more preferably 0.5 M, and particularly preferably 0.7 M. On the other hand, the upper limit of the content of the electrolyte salt in the nonaqueous electrolyte is not particularly limited, but is preferably 2.5 M, more preferably 2 M, and even more preferably 1.5 M.

(Method of Manufacturing Nonaqueous Electrolyte Energy Storage Device)

The method of manufacturing the energy storage device is not particularly limited, and can be performed by combining known methods. The manufacturing method includes, for example, a step of preparing a positive electrode and a negative electrode, a step of preparing a nonaqueous electrolyte, a step of forming alternately superimposed electrode assemblies by laminating or winding the positive electrode and the negative electrode with a separator interposed therebetween, a step of accommodating the positive electrode and the negative electrode (electrode assembly) in a battery case, and a step of injecting the nonaqueous electrolyte into the battery case. The injection can be performed by a known method. After the injection, the nonaqueous electrolyte secondary battery (energy storage device) can be obtained by sealing an injection port.

In addition, the negative electrode can be manufactured by a conventionally well-known method. Specifically, the negative electrode can be obtained by laminating a negative electrode mixture layer directly or via an intermediate layer on the negative electrode substrate. The lamination of the negative electrode mixture layer can be obtained by coating the negative electrode mixture layer-forming material (negative electrode mixture). The negative electrode mixture layer-forming material is generally a paste containing each component of the negative electrode mixture layer and a dispersion medium (solvent). As the dispersion medium, an organic solvent such as water or N-methylpyrrolidone (NMP) may be appropriately selected and used. Coating of the negative electrode mixture layer-forming material can be performed by a known method. Generally, after coating, the coating film is dried to volatilize the dispersion medium. Then, it is preferable to press the coating film in the thickness direction. With this, the density and adhesion of the negative electrode mixture layer can be increased. The press can be performed using a known apparatus such as a roll press.

Other Embodiments

The present invention is not limited to the above-described embodiment, and can be implemented in a mode in which various changes and improvements are made in addition to the above-described mode. For example, in the above-described embodiment, the nonaqueous electrolyte energy storage device has been mainly described as a nonaqueous electrolyte secondary battery; however, other nonaqueous electrolyte energy storage devices may be used. Examples of other nonaqueous electrolyte energy storage devices include a capacitors (electric double layer capacitor and lithium ion capacitor). Further, in the negative electrode of the nonaqueous electrolyte energy storage device, the negative electrode mixture may not form a clear layer. For example, a structure in which the graphite and the graphitizable carbon are supported on a mesh-like negative electrode substrate may be used.

Figure 1:
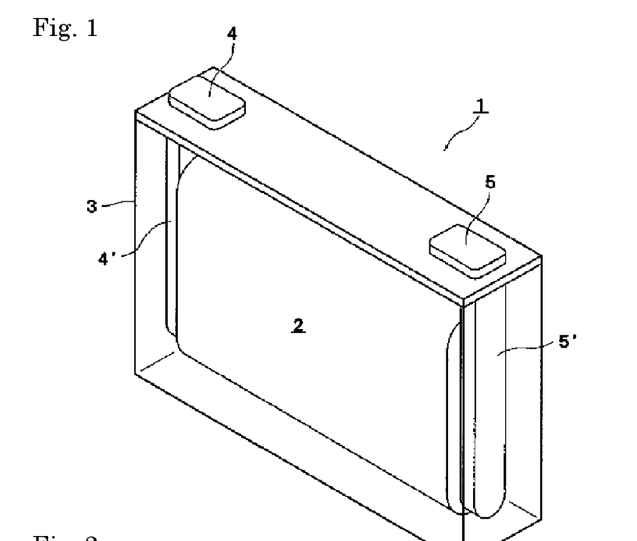
FIG. 1 is an external perspective view illustrating a nonaqueous electrolyte secondary battery according to an embodiment of a nonaqueous electrolyte energy storage device of the present invention.

FIG. 1 is a schematic diagram of a rectangular nonaqueous electrolyte secondary battery 1 which is an embodiment of the nonaqueous electrolyte energy storage device according to the present invention. FIG. 1 is also a view illustrating the inside of the battery case in a perspective manner. In the nonaqueous electrolyte secondary battery 1 illustrated in FIG. 1, an electrode assembly 2 is contained in a battery case 3. The electrode assembly 2 is formed by winding a positive electrode and a negative electrode with a separator interposed therebetween, the positive electrode including a positive active material, the negative electrode including a negative active material. The positive electrode is electrically connected to a positive electrode terminal 4 through a positive electrode lead 4' and the negative electrode is electrically connected to a negative electrode terminal 5 through a negative electrode lead 5'.

Figure 2:
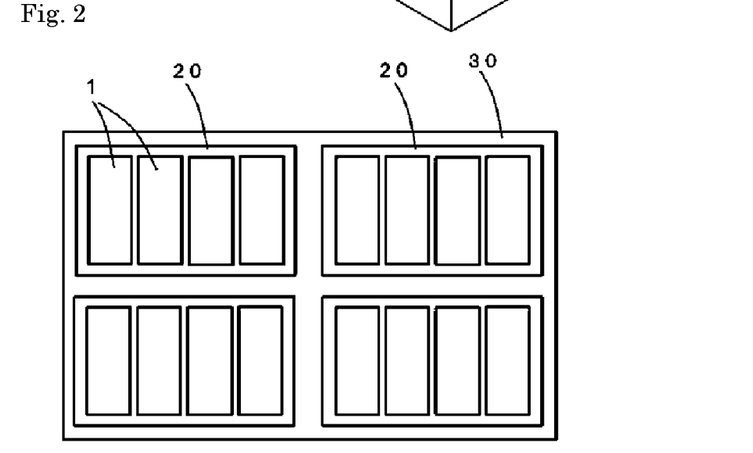
FIG. 2 is a schematic view illustrating an energy storage apparatus configured to assemble a plurality of nonaqueous electrolyte secondary batteries according to an embodiment of the nonaqueous electrolyte energy storage device of the present invention.

The configuration of the nonaqueous electrolyte energy storage device according to the present invention is not particularly limited, and examples thereof include a cylindrical energy storage device, a square energy storage device (rectangular energy storage device), and a flat energy storage device. The present invention can also be realized as an energy storage apparatus including a plurality of the energy storage devices. One embodiment of the energy storage apparatus is shown in FIG. 2. In FIG. 2, an energy storage apparatus 30 includes a plurality of energy storage units 20. Each energy storage unit 20 includes a plurality of nonaqueous electrolyte secondary batteries 1. The energy storage apparatus 30 can be mounted as a power source for an automobile such as an electric vehicle (EV), a hybrid vehicle (HEV), a plug-in hybrid vehicle (PHEV), or the like.

EXAMPLES

Hereinafter, the present invention will be described more specifically with reference to Examples; however, the present invention is not limited to the following Examples.

Example 1

(Preparation of Negative Electrode)

A negative electrode mixture paste was prepared using graphite, graphitizable carbon (median diameter 4 μm), styrene-butadiene rubber (SBR) as a binding agent, carboxymethylcellulose (CMC), and water as a solvent. As the graphite, those obtained by mixing natural graphite (median diameter 13 μm) and artificial graphite (median diameter 21 μm) at a mass ratio of 50:50 were used. The mass ratio of the graphite and the graphitizable carbon was 90:10, and the total mass of graphite and graphitizable carbon, the mass ratio of SBR, and CMC were 96:2:2. The negative electrode mixture paste was prepared through a kneading step using a multi-blender mill by adjusting the amount of water to adjust the solid content ratio (% by mass) in the negative electrode mixture paste. A negative electrode mixture layer was prepared by intermittently applying the negative electrode paste to both sides of a copper foil (thickness 10 μm) as a negative electrode substrate, leaving an uncoated part (region where negative electrode mixture layer is not formed), and drying at 120° C. for 30 minutes. Then, the negative electrode was obtained by performing roll-pressing to make a predetermined filling density. Note that, the formed negative electrode mixture layer had a porosity of 34%. In addition, the ratio (major axis/minor axis) of the major axis to the minor axis in the graphitizable carbon used was 1.4.

(Method of Manufacturing Battery)

A secondary battery (nonaqueous electrolyte energy storage device) of Example 1 was prepared using a negative electrode, a positive electrode having a positive electrode mixture layer in which the mass ratio of $LiNi_{1/3}Co_{1/3}Mn_{1/3}O_2$ as a positive active material, acetylene black as a conductive agent, and polyvinylidene fluoride was 90:5:5, and a polyethylene separator, and a nonaqueous electrolyte in which $LiPF_6$ was dissolved in 1.2 mol/L in a nonaqueous solvent in which EC, DMC, and EMC were mixed at a volume ratio of 30:30:40).

Example 2 and Comparative Examples 1 to 4

Respective secondary batteries (nonaqueous electrolyte energy storage devices) of Example 2 and Comparative Examples 1 to 4 were prepared in the same manner as that in Example 1 except that the mass ratio of the graphite and the graphitizable carbon was as indicated in Table 1.

Reference Examples 1 to 4

Respective secondary batteries (nonaqueous electrolyte energy storage devices) of Reference Examples 1 to 4 were prepared in the same manner as that in Example 1 except that non-graphitizable carbon was used instead of the graphitizable carbon, and the mass ratio of the graphite and the non-graphitizable carbon was as indicated in Table 1.

(Measurement of Initial Discharge Capacity and Power Resistance)

Each secondary battery was charged to 4.2V with a constant current of 1C(A) at 25° C., and further charged for a total of 3 hours at a constant voltage of 4.2V, and then discharged to a final voltage of 2.75V with a constant current of 1C(A) so as to measure the initial discharge capacity. Furthermore, for each secondary battery after the initial discharge capacity confirmation test, a state of charge (SOC) of the battery was adjusted to 50% by charging 50% of the initial capacity, and was held at 25° C. for 3 hours, and then a voltage (E1) when discharging for 10 seconds at 0.2C(I1), a voltage (E2) when discharging for 10 seconds at 0.5O2), and a voltage (E3) when discharging for 10 seconds at 1C(I3) were measured respectively. The DC resistance was calculated using these measured values (E1, E2, and E3). Specifically, on the graph with a horizontal axis representing a current and a vertical axis representing a voltage, the measured values E1, E2, and E3 were plotted, these three points are approximated by a regression line (approximate line) by the least square method, and the slope of the straight line was defined as a direct current resistance (DCR) with a SOC of 50% at 25° C. This is the power resistance. Note that, the "1C" is a current value that provides the same amount of electricity as the nominal capacity of the battery when a constant current is applied to the battery for one hour.

(Charge-Discharge Cycle Test)

A cycle test was conducted 700 cycles for charging to 4.2V at a charging current of 1C(A) in a 45° C. constant temperature bath, further charging for a total of 3 hours at a constant voltage of 4.2V, and then discharging a constant current to 2.75V at a discharging current of 1C(A).

(Measurement of Power Resistance after Charge-Discharge Cycle Test and Calculation of Change Rate of Power Resistance)

The power resistance after the charge-discharge cycle test was measured for each secondary battery after the charge-discharge cycle test in the same manner as that in the above "Measurement of initial discharge capacity and power resistance". By dividing the value obtained by subtracting the initial power resistance from the power resistance after the charge-discharge cycle test by the initial power resistance, the change rate of the power resistance after the charge-discharge cycle test was obtained.

(Calculation of Relative Change Rate)

Based on the change rate of the power resistance of Comparative Example 1 using only graphite as a negative active material, a value obtained by dividing a difference (a value obtained by subtracting the change rate of Comparative Example 1 from the change rate of Examples or Comparative Examples other than Comparative Example 1) of the change rate of Comparative Example 1 by the change rate of Comparative Example 1 was calculated as a relative change rate. That is, in a case where the relative change rate is positive, it indicates that the change rate is greater than Comparative Example 1, and in a case where the relative change rate is negative, it indicates that the change rate is smaller than Comparative Example 1. Each relative change rate is indicated in Table 1 and FIG. 3.

TABLE 1

| | Amorphous carbon (kinds) | Mass ratio (graphite:amorphous carbon) | Relative change rate (%) |
|---|---|---|---|
| Comparative Example 1 | — | 100:0 | 0 |
| Example 1 | Graphitizable carbon | 90:10 | −30.4 |
| Example 2 | | 80:20 | −25.2 |
| Comparative Example 2 | | 70:30 | 18.9 |
| Comparative Example 3 | | 60:40 | 46.9 |

TABLE 1-continued

| | Amorphous carbon (kinds) | Mass ratio (graphite:amorphous carbon) | Relative change rate (%) |
|---|---|---|---|
| Comparative Example 4 | | 50:50 | 110.2 |
| Reference example 1 | Non-graphitizable carbon | 90:10 | 72.9 |
| Reference example 2 | | 80:20 | 90.2 |
| Reference example 3 | | 70:30 | 6.3 |
| Reference example 4 | | 50:50 | 92.6 |

Figure 3:
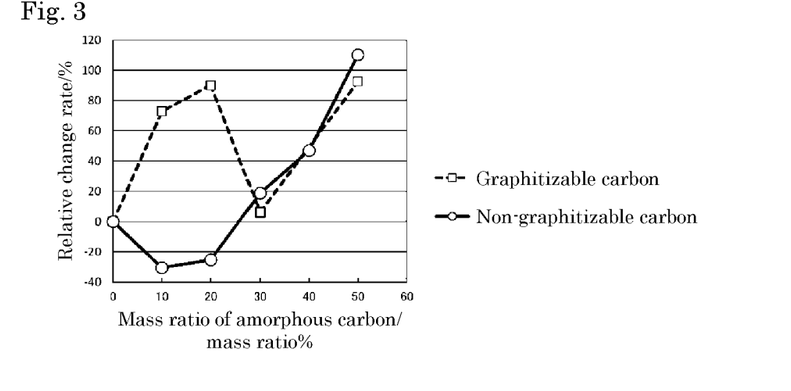
FIG. 3 is a graph illustrating a relative change rate in Examples 1 and 2, Comparative Examples 1 to 4, and Reference Examples 1 to 4.

As indicated in Table 1 and FIG. 3, it can be seen that Examples 1 and 2 in which less than a predetermined amount of graphitizable carbon was mixed with respect to graphite were negative in relative change rate, that is, an increase in the power resistance accompanying the charge-discharge cycle at a high temperature is suppressed as compared with a case where only the graphite was used. On the other hand, as described as a reference example, it can be seen that in a case where non-graphitizable carbon as amorphous carbon is mixed with the graphite, an increase in the power resistance cannot be suppressed even if the non-graphitizable carbon is mixed in the same ratio.

Example 3

A secondary battery (nonaqueous electrolyte energy storage device) of Example 3 was prepared in the same manner as that in Example 1 except that a copper foil having a thickness of 20 μm was used as the negative electrode substrate.

Examples 4 to 7

The secondary batteries (nonaqueous electrolyte energy storage devices) of Examples 4 to 7 were prepared in the same manner as that in Example 3 except that as graphite, natural graphite having a median diameter of 13 μm and artificial graphite having a median diameter of 21 μm were mixed at a mass ratio indicated in Table 2.

Example 8 and Comparative Example 5

Respective secondary batteries (nonaqueous electrolyte energy storage devices) of Example 8 and Comparative Example 5 were prepared in the same manner as that in Example 3 except that the mass ratio of the graphite and the graphitizable carbon was as indicated in Table 3. Note that, in Table 3, Example 4 is indicated again.

(Evaluation)

For the secondary batteries of Examples 3 to 8 and Comparative Example 5, except that the cycle test was performed 50 cycles, the same evaluation was performed as in the above "Measurement of initial discharge capacity and power resistance", "Charge-discharge cycle test" and "Measurement of power resistance after charge-discharge cycle test and calculation of change rate". The power resistance after the charge-discharge cycle test was performed after 25 cycles and after 50 cycles.

Tables 2 and 3 indicate the obtained power resistance before the charge-discharge cycle test and the change rate of the power resistance after 25 cycles and 50 cycles.

TABLE 2

| | Mass ratio of graphite (natural graphite:artificial graphite) | Median diameter of graphite (μm) | Mass ratio (graphite:graphitizable carbon) | Particle size ratio (graphitizable carbon/graphite) | Power resistance/Ω Before cycle | Change rate of power resistance/% After 25 cycles | After 50 cycles |
|---|---|---|---|---|---|---|---|
| Example 3 | 100:0 | 13 | 80:20 | 0.31 | 1.81 | −0.6 | 8.8 |
| Example 4 | 75:25 | 14.8 | 80:20 | 0.27 | 1.92 | −6.2 | 2.1 |
| Example 5 | 50:50 | 16.5 | 80:20 | 0.24 | 2.05 | −3.9 | 1.5 |
| Example 6 | 37.5:62.5 | 17.4 | 80:20 | 0.23 | 2.00 | −1.5 | 3.5 |
| Example 7 | 25:75 | 19.3 | 80:20 | 0.21 | 1.92 | −0.5 | 8.3 |

TABLE 3

| | Mass ratio of graphite (natural graphite:artificial graphite) | Median diameter of graphite (μm) | Mass ratio (graphite:graphitizable carbon) | Particle size ratio (graphitizable carbon/graphite) | Power resistance/Ω Before cycle | Change rate of power resistance After 25 cycles | After 50 cycles |
|---|---|---|---|---|---|---|---|
| Example 8 | 75:25 | 14.8 | 90:10 | 0.27 | 2.03 | −3.0 | 3.0 |
| Example 4 | 75:25 | 14.8 | 80:20 | 0.27 | 1.92 | −6.2 | 2.1 |
| Comparative Example 5 | 75:25 | 14.8 | 70:30 | 0.27 | 1.76 | 13.6 | 15.3 |

As indicated in Table 2, it can be seen that by using natural graphite and artificial graphite as graphite, the increase in the power resistance can be suppressed, and the increase in the power resistance can be further suppressed by setting the mass ratio within a predetermined range.

As indicated in Table 3, it can be seen that the change rate of the power resistance is low in Examples 8 and 4 used by mixing less than a predetermined amount of graphitizable carbon with respect to graphite, as compared with Comparative Example 5 having a high content of graphitizable carbon. In addition, unlike the case of Table 1, as a result of comparing Example 8 with Example 4, it can be seen that the increase in the power resistance is further suppressed in Example 4 with a relatively high content of graphitizable carbon. This is presumed to be influenced by the number of cycles in the charge-discharge cycle test. Further, it can be seen that the relatively high content of graphitizable carbon has low initial power resistance.

INDUSTRIAL APPLICABILITY

The present invention can be applied to a nonaqueous electrolyte energy storage device used as a power source for electronic devices such as personal computers and communication terminals, automobiles, and the like.

DESCRIPTION OF REFERENCE SIGNS

1: Nonaqueous electrolyte secondary battery
2: Electrode assembly
3: Battery case
4: Positive electrode terminal
4': Positive electrode lead
5: Negative electrode terminal
5': Negative electrode lead
20: Energy storage unit
30: Energy storage apparatus

The invention claimed is:

1. A nonaqueous electrolyte energy storage device comprising a negative electrode including graphite and graphitizable carbon,
    wherein a ratio of a mass of the graphitizable carbon to a total mass of the graphite and the graphitizable carbon is 6% by mass or more and 14% by mass or less, and
    wherein a median diameter of the graphitizable carbon is smaller than a median diameter of the graphite,
    wherein the graphite includes natural graphite and artificial graphite, and
    wherein a mass ratio (natural graphite/artificial graphite) of the natural graphite to the artificial graphite is 37.5/62.5 or more and 75/25 or less.

2. The nonaqueous electrolyte energy storage device according to claim 1, wherein a ratio (graphitizable carbon/graphite) of the median diameter of the graphitizable carbon to the median diameter of the graphite is 0.30 or less.

3. The nonaqueous electrolyte energy storage device according to claim 1, wherein the graphitizable carbon is a particle having a major axis and minor axis, wherein a ratio (major axis/minor axis) of the major axis of the particle to the minor axis of the particle is 2 or less.

4. The nonaqueous electrolyte energy storage device according to claim 1, wherein the median diameter of the graphite is 18 μm or less.

5. The nonaqueous electrolyte energy storage device according to claim 1, wherein the median diameter of the graphitizable carbon is 10 μm or less.

6. The nonaqueous electrolyte energy storage device according to claim 1, wherein a ratio (graphitizable carbon/graphite) of the median diameter of the graphitizable carbon to the median diameter of the graphite is 0.2 or more.

7. A nonaqueous electrolyte energy storage device comprising a negative electrode including graphite and graphitizable carbon,
    wherein a ratio of a mass of the graphitizable carbon to a total mass of the graphite and the graphitizable carbon is less than 26% by mass, wherein a median diameter of the graphitizable carbon is smaller than a median diameter of the graphite, wherein a ratio (graphitizable carbon/graphite) of the median diameter of the graphitizable carbon to the median diameter of the graphite is 0.28 or less, wherein the graphite includes natural graphite and artificial graphite, and wherein a mass ratio (natural graphite/artificial graphite) of the natural graphite to the artificial graphite is 37.5/62.5 or more and 75/25 or less.

8. The nonaqueous electrolyte energy storage device according to claim 7, wherein the graphitizable carbon is a particle having a major axis and minor axis, wherein a ratio (major axis/minor axis) of the major axis of the particle to the minor axis of the particle is 2 or less.

9. The nonaqueous electrolyte energy storage device according to claim 7, wherein the median diameter of the graphite is 18 μm or less.

10. The nonaqueous electrolyte energy storage device according to claim 7, wherein the median diameter of the graphitizable carbon is 10 μm or less.

11. The nonaqueous electrolyte energy storage device according to claim 7, wherein the ratio (graphitizable carbon/graphite) of the median diameter of the graphitizable carbon to the median diameter of the graphite is 0.2 or more.

12. A nonaqueous electrolyte energy storage device comprising a negative electrode including graphite and graphitizable carbon, wherein a ratio of a mass of the graphitizable carbon to a total mass of the graphite and the graphitizable carbon is 3% by mass or more, wherein a median diameter of the graphitizable carbon is smaller than a median diameter of the graphite, wherein a ratio (graphitizable carbon/graphite) of the median diameter of the graphitizable carbon to the median diameter of the graphite is 0.30 or less, wherein the graphite includes natural graphite and artificial graphite, and wherein a mass ratio (natural graphite/artificial graphite) of the natural graphite to the artificial graphite is 37.5/62.5 or more and 75/25 or less.

13. The nonaqueous electrolyte energy storage device according to claim 12, wherein the graphitizable carbon is a particle having a major axis and minor axis, wherein a ratio (major axis/minor axis) of the major axis of the particle to the minor axis of the particle is 2 or less.

14. The nonaqueous electrolyte energy storage device according to claim 12, wherein the median diameter of the graphite is 18 μm or less.

15. The nonaqueous electrolyte energy storage device according to claim 12, wherein the median diameter of the graphitizable carbon is 10 μm or less.

16. The nonaqueous electrolyte energy storage device according to claim 12, wherein the ratio (graphitizable carbon/graphite) of the median diameter of the graphitizable carbon to the median diameter of the graphite is 0.2 or more.

* * * * *